United States Patent [19]

Maury

[11] Patent Number: 4,984,901
[45] Date of Patent: Jan. 15, 1991

[54] MAGNETIC RECORDING DISC HAVING SECTOR REFERENCE ZONE, DEVICE FOR READING SAME, AND MAGNETOOPTICAL MEMORY OPTOELECTRONIC EMPLOYING SAID DEVICE

[75] Inventor: Christian Maury, Voisins le Bx, France

[73] Assignee: Bull S.A., Paris, France

[21] Appl. No.: 198,221

[22] Filed: May 25, 1988

[30] Foreign Application Priority Data

May 27, 1987 [FR] France ................. 87 07514

[51] Int. Cl.$^5$ ............... G11B 7/095; G11B 7/013
[52] U.S. Cl. .................. 369/44.26; 360/77.08; 360/135; 369/13; 369/44.39
[58] Field of Search ............ 360/27, 40, 42, 44, 360/48, 49, 70, 77.02, 77.06–77.08, 135; 369/13, 43–47, 59, 44.26, 44.34–44.36, 44.39; 358/342

[56] References Cited

U.S. PATENT DOCUMENTS

| | | | |
|---|---|---|---|
| 4,151,571 | 4/1979 | Cardot et al. | 360/77.08 |
| 4,354,208 | 10/1982 | Maury | 360/40 |
| 4,354,210 | 10/1982 | Droux | 360/77.08 |
| 4,379,256 | 4/1983 | Maury | 360/77.08 X |
| 4,392,164 | 7/1983 | Lequien | 360/77.08 |
| 4,400,746 | 8/1983 | Lequien | 360/77.08 |
| 4,424,543 | 1/1984 | Lewis et al. | 360/77.08 X |
| 4,510,544 | 4/1985 | Lazzari | 369/13 X |
| 4,530,019 | 7/1985 | Penniman | 360/77.08 |
| 4,539,607 | 9/1985 | Fujiki | 360/77.08 |
| 4,594,622 | 6/1986 | Wallis | 360/77.08 X |

FOREIGN PATENT DOCUMENTS 0050695 5/1982 European Pat. Off. .
8301858 5/1983 PCT Int'l Appl. .

OTHER PUBLICATIONS

362 Japanese Journal of Applied Physics, vol. 21 (1982), Aug., No. 8, Part 2, Tokyo, Japan, pp. L509–L511.
Japanese Patent Abstract JP-A-61-229278, vol. 11, No. 66, Feb. 27, 1987.
Japanese Patent Abstract JP-A-60-263346, vol. 10, No. 147, May 29, 1986.
Japanese Patent Abstract JP-A-57-169947, vol. 7, No. 15, Jan. 21, 1983.
Japanese Patent Abstract JP-A-61-013457, vol. 10. No. 160, Jun. 7, 1986.
Computer Technology Review, vol. 3, No. 1, pp. 241-243, Jan. 1983.

Primary Examiner—Aristotelis M. Psitos
Assistant Examiner—W. R. Young
Attorney, Agent, or Firm—Kerkam, Stowell, Kondracki & Clarke

[57] ABSTRACT

A mode of writing on a magnetic recording carrier (DISC) where the information is distributed over a plurality N of tracks, each track being associated with at least one reference zone ($ZRP_{ij}$) including preamble information, absolute address information and fine-position information. According to the invention, the mode of writing is characterized in that the reference zone includes a first portion ($GCP_{ij}$) comprising preamble and address information and a second portion ($GDP_{ij}$) comprising fine-position information, the first portion being disposed and centered over the track of serial number j, while the second portion is offset by one-half of a track with respect to the center of that track and on the same side of that track. The invention is applicable to magnetooptical disk memories.

6 Claims, 4 Drawing Sheets

MAGNETIC RECORDING DISC HAVING SECTOR REFERENCE ZONE, DEVICE FOR READING SAME, AND MAGNETOOPTICAL MEMORY OPTOELECTRONIC EMPLOYING SAID DEVICE

FIELD OF THE INVENTION

The present invention relates to a mode for writing information on a magnetic recording carrier. More particularly, it is applicable to magnetooptical disk memories.

BACKGROUND OF THE INVENTION

In information processing systems, the trend in technology is to use magnetooptical disk memories, because of the large amount of information they are capable of containing per unit of surface area. These are memories in which the information is recorded on magnetic disks (for example by means of magnetic trandsducers) and read by optoelectronic devices.

Their mode of operation is based on the magnetooptical effect, which has to do with the interaction of a rectilinear polarized light with the magnetic state of the material comprising the recording layer of the magnetic disks. Reading of the information is performed by an optoelectronic device, including a more or less complex optical focusing device associated with photoelectronic transducers and amplifying circuits for the signals furnished by these transducers. These optoelectronic devices make it possible, at a given moment and in a given region, to observe a surface of a disk by means of a beam of polarized light, and to furnish an electrical signal the voltage (or current) of which is a function of the value of the information located in this region. The magnetooptical effect is described in greater detail, and the manner in which it can be used to read the information contained on the magnetic disks of the magnetooptical memory is also discussed in French Patent 2 514 913, filed on Oct. 16, 1981 by CII Honeywell Bull, now known as Bull S.A. This French patent corresponds to U.S. Pat. No. 4,510,544.

It is known that the magnetic disks carry these items of information in an encoded binary form on circular concentric recording tracks the width of which is on the order of several micrometers and which are disposed on both surfaces of the disks.

Each track is assigned a serial number j, j being an integer varying from 0 to N—-1 and N being the total number of recording tracks. This number of tracks is on the order of several thousand. The encoded expression of the serial number j of a track is known as its address. In this case, the address is called the "absolute address".

The magnetic disks have a constant speed of rotation.

In practice, with standard disk memories (where the information is written and read by the same magnetic transducer), and more particularly in the case of memories that include only a limited number of disks (generally fewer than 4 or 5), the information is recorded on each of the surfaces (sides) of the disks in the manner described in French Patent 2 439 435, filed on Oct. 19, 1978, and corresponding to U.S. Pat. No. 4,354,208. A maximum of space is reserved for recording the data intended for processing by the information processing system to which these memories belong.

A minimum of space is reserved for recording the addresses of the tracks, on the one hand, and on the other for recording the information, known as "fine-position information", necessary for the automatic control of the position above the tracks of the magnetic transducer associated with this side.

In present practice, as described in the aforementioned French patent, the information contained on each side of the disk is preferably distributed over equal and adjacent circular sectors $S_0, S_1, \ldots, S_i, \ldots, S_n$. Typically, one side of the disk is divided into several tens of sectors (for example on the order of 80 to 90 sectors).

When a sector $S_i$ (or more generally a first group of information) is read or written prior to a sector $S_{i+1}$ (or more generally, a second group of information), then it is said that the sector $S_i$ precedes the sector $S_{i+1}$.

Each sector $S_i$ is in turn divided into two unequal areas. The larger area includes the data intended for processing by the information processing system to which the disk memory belongs, while the smaller area includes the track addresses and the fine-position information. For each sector, the smaller area is divided into a plurality of zones known as reference zones. Each track is associated with at least one zone having the same serial number j as the track.

A blank zone not containing any information is disposed between the larger area and the smaller area. This blank zone precedes the reference zones.

It is known that in order to record a succession of information on a magnetic disk, a succession of small magnetic domains adjacent to one another and of variable length are created on each track of the disk, distributed over the entire length of the track and alternatingly having magnetization of one type and the opposite type. The geographic boundary between two adjacent magnetic domains is called the magnetic transition.

Thus as described in French Patent 2 439 435, the reference zones have the same width as the tracks, each zone being offset by a distance equal to the width of one-half of a track, with respect to the track having the serial number j with which it is associated. Because of this, the boundary between two adjacent reference zones of serial numbers j and j+1 is coincident with the middle of the track having the serial number j.

Moreover, each reference zone includes three portions, that is, a first portion known as the preamble, preceding a second portion containing address information, which in turn precedes a third portion including the fine-position information. The preamble portion contains the information, the use of which by the reading circuits of the disk memory makes it possible to determine the gain of the amplifiers of these circuits such that the precision of reading the addresses and the fine-position information is as great as possible. This preamble information can equally well serve as synchronizing information making it possible to determine the beginning of each reference zone.

The address information is written using the Gray code; that is, two successive addresses written in two adjacent reference zones associated with tracks of serial number j and (j+1) differ by only a single bit. Preferably, the three aforementioned portions are of the same length and include the same number of cells, each datum comprising the presence or absence of a double magnetic transition.

The writing mode described briefly above, used in conventional disk memories, can be transposed and applied to magnetooptical disk memories on the condition that the following disadvantages are overcome:

When the reading transducer reads the data recorded on a predetermined track, being perfectly centered over the track, it reads the information contained in the reference zones, straddling them; that is, it simultaneously reads the information contained in each of these zones. Since the addresses are written in Gray code, the address information read by the reading transducer will all be determined perfectly, except for a single bit, known as the uncertain bit, since two adjacent addresses differ by this bit. Hence it is permanently necessary to determine the value of this uncertain bit with a supplementary electronic circuit, which lends a relative complexity to the electronic reading circuit.

Since the items of fine-position information are relatively numerous, the associated electronic circuits that make it possible to determine whether the writing or reading transducer is perfectly centered over the track that is being written upon or read are relatively complicated.

The portion containing the preamble information is poorly adapted to use in magnetooptical disk memories. In fact, the disks used in these memories have an error rate on the order of $10^{-5}$ (one error per $10^5$ items of information written), which is considered relatively high. The first portion containing the preamble information simultaneously serves on the one hand to monitor the gain of the reading circuit amplifiers and on the other to determine the beginning of the zone and so does not offer sufficient warranty for precise detection of the reference zone, given the aforementioned error rate.

SUMMARY OF THE INVENTION

The mode of writing operating information in a reference zone in accordance with the invention is particularly well adapted for reading and writing fine-position information and address operating information in the reference zones of disks used in the magnetooptical memories, by overcoming the aforementioned disadvantages. Moreover, it makes it possible to read the information (not only the information of the reference zones, but the data to be processed as well) with a single beam of light, contrary to frequent practice in magnetooptical memories where the information is read by means of three beams of light: In this case, the central beam makes it possible to read the data, and the two side beams serve to determine the position of either the writing device or the reading device with respect to the disk tracks. A description of the use of three beams for reading information from a disk of a magnetooptical memory is found in the publication by Nobutake Iamamura and Chuichi Ota, entitled "Experimental Study on Magnetooptical Disc Exerciser with the Laser Diode and Amorphous Magnetic Scene Films" published in the Japanese Journal of Applied Physics, Vol. 19, No. 12, Dec. 1980.

According to the invention, the mode of writing on a magnetic recording carrier where the information items are written in binary code and are distributed over a plurality N of tracks, each track being associated with at least one reference zone preceded by a blank zone, which includes at least one group of preamble information, one group including absolute address information and one group containing fine-position information, is characterized in that the reference zone includes a first portion comprising groups of preamble information and absolute address information and a second portion comprising the group of fine-position information, the first portion being disposed and centered on the track of serial number j, while the second portion is offset with respect to the axis of symmetry of this same track, on the same side as the axis, such that the boundary between two second portions belonging to two adjacent reference zones coincides with the middle of the track of serial number j.

In a preferred embodiment of the invention, the second portion comprises two adjacent magnetic domains of opposed magnetization, wherein the corresponding magnetic domains of two second portions belonging to two adjacent reference zones are likewise of opposed magnetization.

In another preferred embodiment of the invention, the group of preamble information includes a first subgroup of synchronizing information, followed by a second subgroup of automatic gain control information.

The characteristics and advantages of the present invention will become more apparent from the ensuing detailed description given by way of example and taken in conjunction with the accompanying drawing.

BRIEF DESCRIPTION OF THE DRAWINGS

FIG. 1, including FIG. 1c is an enlarged view of a portion of FIG. 1a, and FIG. 1b shows a portion of the disk in greater detail;

DESCRIPTION OF THE PREFERRED EMBODIMENTS

Figure 1B:
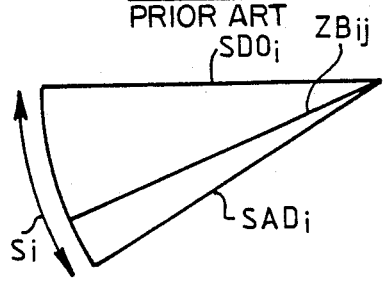
FIGS. 1a, 1b, 1c, shows a preferred example of information distribution on a magnetic disk in the prior art, such as that described in aforementioned French Patent 2 439 435.
Figure 1A:
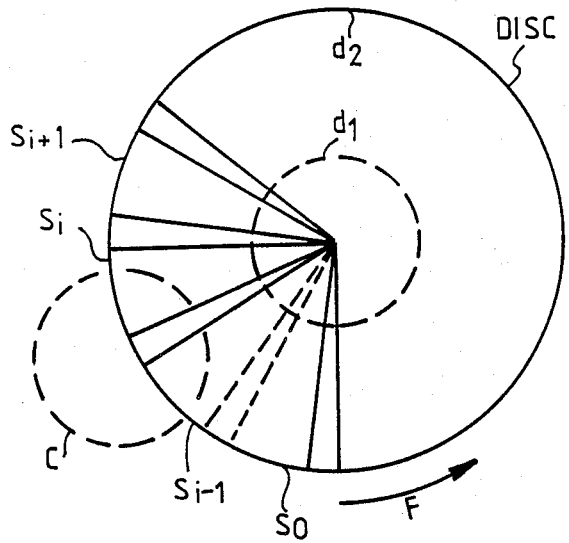
Figure 1C:
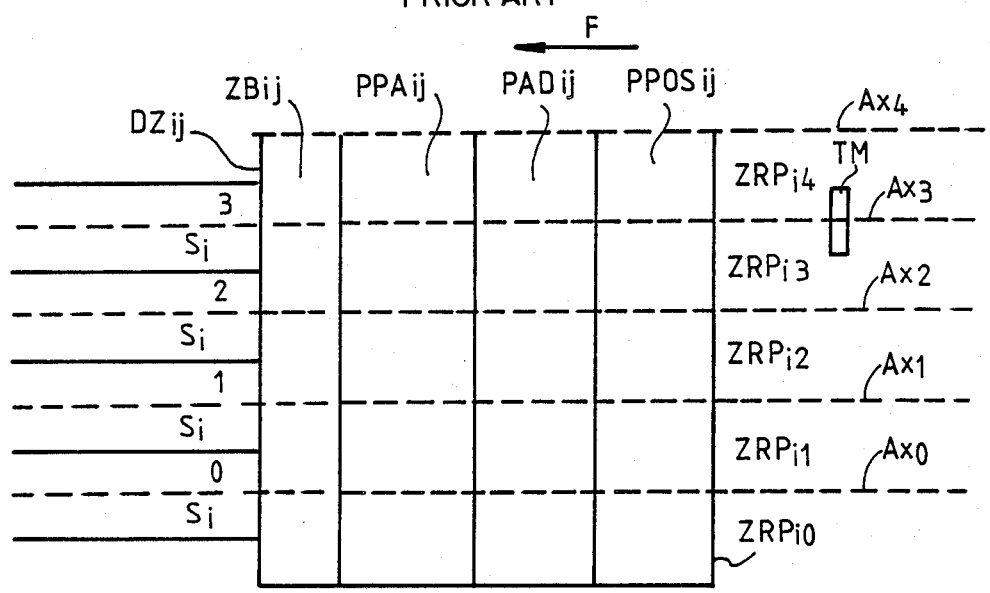
Figure 2:
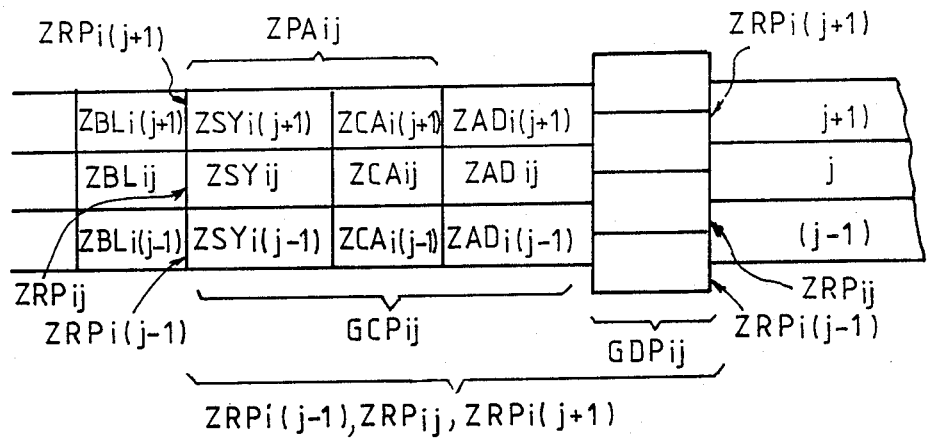
FIG. 2 shows a set of three reference zones where the information is written by the mode of writing according to the invention.

In order to better understand how the items of information of reference zones of a recording carrier are written in accordance with the invention, some review is necessary, illustrated by FIGS. 1a, 1b, 1c, showing on the one hand how the items of information are distributed over the surface of a magnetic recording carrier, such as a magnetic disk, in the prior art (FIGS. 1a and 1b) and on the other hand (FIG. 1c) how the items of information are written inside the reference zones, again according to the prior art.

In FIGS. 1a–1c, it is assumed that the items of information are written in the reference zones of a magnetic disk DISC.

In FIG. 1a, this disk DISC rotates in the direction of the arrow F. Its useful recording surface area is defined by the circles $d_1$, $d_2$. On the disk DISC, a number p of equal and adjacent circular sectors $S_0, S_1, \ldots, S_i, \ldots, S_p$ are defined. Thus as can be better seen in FIG. 1b, each sector $S_i$ is divided into two portions $SDO_i$, $SAD_i$ in which, respectively, the data to be processed, on the one hand, and the address information and fine-position information, on the other, are recorded. The surface area of the portion $SAD_i$ is much less than (several percent of) the surface area of the portion $SDO_i$.

Each portion $SAD_i$ of a predetermined sector $S_i$ is divided into $N'=(N+1)$ reference zones $ZRP_{i0}, \ldots, ZRP_{ij}, \ldots, ZRP_{i(N)}$, where N is the total number of recording tracks of the disk DISC. For simplification, FIGS. 1b and 1c show only the reference zones $ZRP_{i0}$ through $ZRP_{i4}$, these zones being symbolized by the rectangles in FIG. 1c.

The boundaries between the various reference zones $ZRP_{ij}$ are coincident with the circles $Ax_j$ defining the middle of a recording track of the magnetic disk DISC. It can be seen that in each sector $S_i$, the reference zones $ZRP_{ij}$ and $ZRP_{i(j+1)}$ are associated with the track of serial number j. Thus the two reference zones $ZRP_{i0}$ and $ZRP_{i1}$ are associated with the track of serial number 0, while reference zones $ZRP_{i1}$, $ZRP_{i2}$ are associated with the track of serial number one, and so forth.

FIG. 1c, more precisely, shows the kind of information contained in each reference zone $ZRP_{ij}$ and how these items of information are distributed inside the zone (as described in the aforementioned French Patent No. 2 439 435).

Thus as indicated above, the reference zones $ZRP_{ij}$ is preceded by a zone known as a blank zone $ZB_{ij}$, where the magnetization is uniform (typically, zero), which makes it possible more easily to detect the beginning of the zone $DZ_{ij}$, which is most often indicated by a special magnetic transition.

The reference zone $ZRP_{ij}$ includes three portions, each including an identical number of items of binary information (for example, about 10), which items are each contained in one information cell. The first portion, called, $PPA_{ij}$ includes the preamble information (as defined above).

The other two portions are the portions $PAD_{ij}$ and $PPOS_{ij}$. The portion $PAD_{ij}$ includes a certain number of items of information defining the absolute address of the track (it is understood that the number is a function of the total number of tracks contained on the disk). The portion $PPOS_{ij}$ includes a certain number of items of fine-position information making it possible to keep the reading transducer associated with the disk DISC centered perfectly above the track of serial number j facing which it is located. This enables much greater precision in reading of the data by the transducer.

Each binary item of information may be comprised of either a single magnetic transition or a double magnetic transition.

The mode of writing information inside the reference zones in accordance with the invention makes it possible to overcome the aforementioned disadvantages and is particularly well suited for use in the disks of magnetooptical memories, which for the sake of simplification will be called magnetooptical disks. Thus for the following discussion it is assumed that the disk DISC is magnetooptical.

Inside each reference zone $ZRP_{ij}$, each binary item of information comprises a magnetic domain of either positive or negative magnetization. The value of each item of information is a function of the sign (+ or −) of the magnetization in each domain (which thus comprises one cell containing one item of information). Thus a binary item of information equal to logical 1 (one) corresponds with a domain of positive magnetization, for example, while a binary item of information equal to logical 0 (zero) corresponds to a negative magnetization.

Thus it will be seen that the items of binary information are not constituted by the magnetic transitions, but instead are constituted directly by the sign of the magnetization inside each elementary magnetic domain.

Each reference zone $ZRP_{ij}$ includes the following:

A first portion, known as the first group of information $GCP_{ij}$, containing a plurality of magnetic domains having substantially the same width as the data track of seriaal number j and having the same center. In other words, the circle which comprises the center of the track of serial number j coincides with the circle that comprises the center of the first portion $GCP_{ij}$ of the reference zone. This first portion of the reference zone $ZRP_{ij}$ can also be said to be "full-track" centered.

A second portion, also called he second group of information, that is, $GDP_{ij}$, the center of which coincides with the boundary between two adjacent data tracks. It can also be said that this second portion $GDP_{ij}$ is off-center with respect to the data tracks of serial number j. Each second portion $GDP_{ij}$ is off-center by a width equal to that of one-half track with respect to the tracks of serial number j, which means that the boundary between two second portions $GDP_{ij}$ and $GDP_{i(j+1)}$, or between $GDP_{ij}$ and $GDP_{i(j-1)}$, coincides respectively with the center of the track j and the center of the track (j−1). The reasons for the division of each reference zone into two portions $GCP_{ij}$ and $GDP_{ij}$, one of which is full-track centered and the other of which is off-center with respect to the track, will be better understood by referring to the description to be made hereinafter with reference to FIGS. 3 and 4.

Preferably, the first portion $GCP_{ij}$ precedes the second portion $GDP_{ij}$.

The first portion $GCP_{ij}$ includes, respectively:

1. a group of preamble information $ZPA_{ij}$, including:
   (a) a subgroup $ZSY_{ij}$ including synchronizing information making it possible to precisely locate the beginning of the reference zone $ZRP_{ij}$,
   (b) a subgroup of data $ZCA_{ij}$, the reading of which makes it possible to determine the gain of the amplifiers of the circuits for reading information contained on the disk DISC;

2. a group of address information $ZAD_{ij}$. As in the reference zones $ZRP_{ij}$ of the prior art, the address is an absolute address and is written in Gray code.

The first portion $GCP_{ij}$ is preceded by the blank zone $ZBL_{ij}$. Preferably, the subgroup $ZSY_{ij}$ precedes the subgroup $ZCA_{ij}$, which precedes the group $ZAD_{ij}$.

It has been possible to determine, by means of computer simulations, that to obtain good detection of the reference zone $ZRP_{ij}$, the synchronizing subgroup $ZSY_{ij}$ must contain 15 bits. The subgroup of information $ZCA_{ij}$, for example, contains 6 pairs of bits equal to 1 and 0, hence a succession of 6 pairs comprising a magnetic domain of positive magnetization followed by a magnetic domain of negative magnetization.

As for the group of address information, it contains 16 bits, which makes it possible to enumerate $2^{16}$ tracks (approximately 65,000 addressable tracks).

Figure 3:
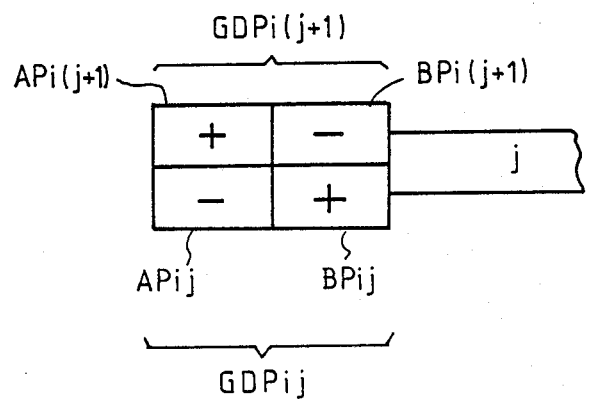
FIG. 3 shows a preferred example of the mode of writing of the second portion of the reference zones containing the fine-position information, according to the invention.

Thus as can be seen in FIG. 3, each second portion $GDP_{ij}$ of the reference zones $ZRP_{ij}$ includes simply two magnetic domains of fine-position information, that is, a first domain $AP_{ij}$ the magnetization of which is in one direction and a second domain $BP_{ij}$ the magnetization of which is in a second direction opposite the first. For the second portion of the adjacent reference zone, that is, $GDP_{i(j+1)}$, the two fine-position information domains, that is, $AP_{i(j+1)}$ and $BP_{i(j+1)}$, have magnetizations in directions opposite those of the magnetizations of the corresponding domains of the adjacent second portion $GDP_{ij}$. Thus if the magnetization in the domain $AP_{ij}$ is negative, the magnetization in the adjoining domain $AP_{i(j+1)}$ is positive, while if the magnetization is positive in the domain $BP_{ij}$, the magnetization is negative in the domain $BP_{i(j+1)}$.

It can be seen that each second portion containing the fine-position information of a reference zone $ZRP_{ij}$ is of extremely simple constitution, and includes only two successive domains of opposed magnetization.

It is clear that the magnetizations in the second portions $GDP_{ij}$, where j is even, comprise domains $AP_{ij}$ and $BP_{ij}$ having magnetizations that are all in the same direction, that is, for example respectively negative and positive, while the second portions $GDP_{i(j+1)}$, where j+1 is odd, all have magnetization in the same direction, that is, respectively positive and negative for the domains $AP_{i(j+1)}$ and $BP_{i(j+1)}$.

Figure 4A:
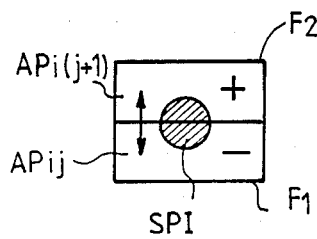
FIG. 4a, b shows the curve of variation of the reading signal obtained when the spot of light produced by the optical reading sensor is displaced facing the fine-position information of two adjacent reference zones.

Turning now to FIG. 4:

In FIG. 4a, the image of the light spot SPI produced by the optical reading sensor has been shown in substantially circular form, the diameter of which is on the order of a micrometer. The light spot SPI is shown straddling the two fine-position information domains $AP_{ij}$ and $AP_{i(j+1)}$.

Figure 4B:
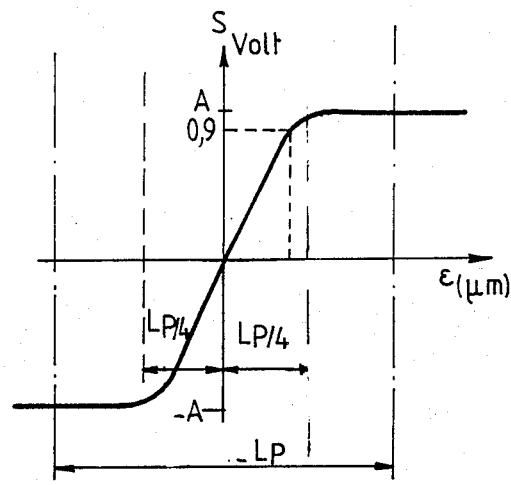

If the light spot SPI is displaced with respect to the two aforementioned domains, from the boundary $F_1$ of the first domain $AP_{ij}$ to the boundary $F_2$ of the second domain $AP_{i(j+1)}$, where $F_1$ is the boundary between the domain $AP_{ij}$ and the domain $AP_{i(j-1)}$, and $F_2$ is the boundary between the domain $AP_{i(j+1)}$ and the domain $AP_{i(j+2)}$, the evolution of the signal furnished by the reading circuits associated with the optical reading devices (for a description of these, please see the aforementioned French Patent No. 2 514 913, for example) is represented by the curve of FIG. 4b. Between the boundary $F_1$ and the boundary $F_2$, the evolution of the signal moves first via a step where the amplitude is equl to $-A$ (assuming that the signal is negative when the light spot is disposed facing a magnetic domain of negative magnetization, and positive when the light spot is disposed facing a magnetic domain of positive magetization) and then increases substantially linearly from the value $-A$ to a value $+A$, passing through a zero value when the light spot SPI is perfectly straddling the two zones $AP_{ij}$ and $AP_{i(j+1)}$, and then evolves once again along a step, this time of amplitude $+A$, when the light spot approaches the boundary $F_2$.

If the evolution of the signal furnished, S, is considered only over a region of width equal to the width $L_p$ of a track, this region having as its center the boundary between the two domains $AP_{ij}$ and $AP_{i(j+1)}$, that is, the center of the track of serial number j, then it can be seen that the region where the signal S is a linear function of the position occupied by the spot SPI has a width slightly less than $2 \times L_{p/4}$, and hence slightly less than $L_{p/2}$. (If $L_p$ equals 3 μm, then this region of linearity is included between 1 and 1.5 μm.)

This has the following consequences:

(1) The linear zone is left behind very quickly when one seeks automatical control of the reading device to a fine position (that is, when the reading device performs reading operations of the data contained on a track of serial number j, which means that the light spot SPI is centered perfectly over this track).

2. Correct reading of the address is certain, if the light spot SPI remains within this zone of linearity.

To perform the reading of the fine-position information, the circuit DLFI is used, functioning analagously to the optoelectronic reading circuit described in French Patent No. 2 514 913, but further utilizing a different mode of reading, which will be described below:

The circuit DLFI includes the following:

the source of polarized light (preferably monochromatic) SLI emitting a beam of incident light $F_i$;

the separator element $ESI_1$;

the mirror MI;

the device DFOCI for focusing the beam of incident light $F_i$ onto the magnetooptical disk DISC, which is reflected by the disk and becomes the reflected beam Fr, the path of the beam of light over the disk DISC forming the light spot SPI;

the second separator element $ESI_2$, which receives the beam of light Fr reflected by the disk DISC, after it has been reflected onto $ESI_1$ and divides it into two beams F'r and F"r of equal light power;

first means $MDI_1$ for detection of the angle of Kerr-effect rotation of the reflected beam F'r including:

a first light analyzer $ANI_1$, with which the reading circuit $CLI_1$ is associated;

second means $MDI_2$ for detecting the angle of Kerr rotation of the reflected beam F"r including:

a second analyzer $ANI_2$ with which the reading circuit $CLI_2$ is associated;

means MDPI for determining the position of the light spot with respect to the two second portions of the two adjacent reference zones, including for example the integrator SOMI associated with the multiplier MULTI.

The analyzer element $ANI_1$ has an overriding direction of propagation of the light forming an angle $+\alpha$ with the electrical field vector $E_i$ of the beam of incident light $F_i$ sent to the surface of the disk DISC.

The analyzer $ANI_2$ has an overriding direction of propagation of the light that forms an angle $-\alpha$ with the vector $E_i$.

The two reading circuits $CLI_1$ and $CLI_2$ are identical and, in a known manner, include photoelectronic transducers, disposed at the output of the two analyzers $ANI_1$ and $ANI_2$ and receiving the light transmitted by these analyzers, as well as amplifiers, which receive the output signals of these photoelectronic transducers (for the sake of simplification in the drawing, neither these photoelectronic transducers nor the associated amplifiers have been shown).

The elements SLI, $ESI_1$, MI, and DFOCI are known. They and their function are described in the aforementioned French Patent No. 2 514 913, for example.

The signal ε furnished by the fine-position information reading device DLFI is the fine-position signal, also known as the fine-position error signal.

The manner in which this signal ε is obtained is described hereinafter, particularly with reference to FIGS. 5 and 6, in which the light spot SPI is imagined to be facing, in succession, the first two domains $AP_{ij}$ through $AP_{i(j+1)}$ and the two second domains $BP_{ij}$ and $BP_{i(j+1)}$.

The light source SLI sends a beam of light $F_i$ onto the disk DISC by way of the separator element ESI1, the mirror MI and the focusing device DFOCI. The beam Fr reflected by the disk DISC, the electrical field vector Fr of which has undergone a Kerr-effect rotation of $\pm\Theta_k$ (see French Patent No. 2 514 913) with respect to the electrical field vector $E_i$ is sent through the focusing device DFOCI, and through the separator elements $ESI_1$ and $ESI_2$, respectively, to the analyzers $ANI_1$ and $ANI_2$. One-half of the light power of the reflected beam Fr is sent in the form of the beam F'r to the analyzer $ANI_1$, and the other half in the form of the beam F"r to the analyzer $ANI_2$. The light power collected by the analyzer $ANI_1$ is converted by the reading circuit $CLI_1$ into a signal $\epsilon a1$ or $\epsilon b1$ depending on whether the spot SPI is disposed simultaneously facing the first two fine-position information domains $AP_{ij}$ and $AP_{i(j+1)}$ or the second domains $BP_{ij}$ and $BP_{i(j+1)}$.

In the same manner, the light power collected by the analyzer $ANI_2$ is converted at the output of the reading circuit $CLI_2$ into a signal $\epsilon a2$ or $\epsilon b2$.

The signals $\epsilon a1$ (or $\epsilon b1$) and $\epsilon a2$ (or $\epsilon b2$) are sent to the integrator element SOMI which furnishes either the signal $\overline{\epsilon a}$ or the signal $\overline{\epsilon b}$ and also functions as a differential amplifier; that is, $\overline{\epsilon a} = \overline{\epsilon a1} - \overline{\epsilon a2}$, and $\overline{\epsilon b} = \overline{\epsilon b1} - \overline{\epsilon b2}$.

This signal is sent to the multiplier MULTI, which varies it with a plus sign when $\overline{\epsilon a}$ is involved or a minus sign if $\overline{\epsilon b}$ is involved. In fact, because the sign of the magnetization in the domains $AP_{ij}$ and $BP_{ij}$ are opposed, it is suitable to multiply the signal $\overline{\epsilon b}$ obtained when the light spot SPI is located facing the second domains $BP_{ij}$ and $BP_{i(j+1)}$ by minus one, in order that the error signal $\epsilon$ will have the same sign as the light spot SPI facing either the two first domains ($AP_{ij}$ or $AP_{i(j+1)}$) or the two second domains ($BP_{ij}$ or $BP_{i(j+1)}$).

The integrator SOMI effects the integration and calculates the mean value of the signals $\overline{\epsilon a1}$, or $\overline{\epsilon a2}$ ($\overline{\epsilon b1}$ or $\overline{\epsilon b2}$) and calculates their difference, $\overline{\epsilon a1} - \overline{\epsilon a2}$ ($\overline{\epsilon b1} - \overline{\epsilon b2}$) for an integration time $t_i$ slightly less than one-half the duration of reading of each of the domains $AP_{ij}$ or $BP_{ij}$, this reading duration being the same for the first and second domains and being equal to the time of passage of one of them before the light spot SPI, the integration taking place whenever the light spot is located facing the central portion of each of the first and second domains.

Figure 5:
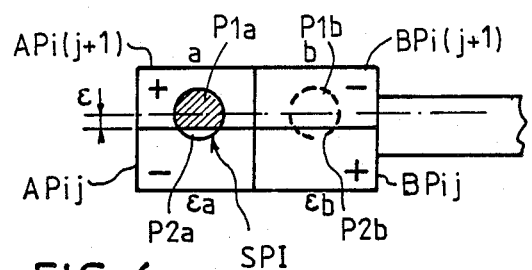
FIGS. 5 and 6 enable better comprehension of how the items of fine-position information of the reference zones are read by an optical reading device using a differential reading mode, and of the advantages of the writing mode of the fine-position information of the reference zones.

Turning now to FIG. 5, and assuming that the light spot SPI is not perfectly centered over the two adjacent domains $AP_{ij}$ and $AP_{i(j+1)}$, or $BP_{ij}$ and $BP_{i(j+1)}$, the result is an error signal $\epsilon$ that is not zero. This light spot SPI is disposed partly facing the first domain $AP_{i(j+1)}$, which is represented by a shaded zone in FIG. 5. The corresponding light power is equal to $P_{1a}$. A portion of the light spot SPI is located facing the first domain $AP_{ij}$. The corresponding light power is $P_{2a}$. Similarly, when the light SPI is disposed facing the second domains, the powers of light corresponding to the portions of the spot that are located respectively facing $BP_{i(j+1)}$ and $BP_{ij}$ are $P_{1b}$ and $P_{2b}$, respectively.

Figure 6:
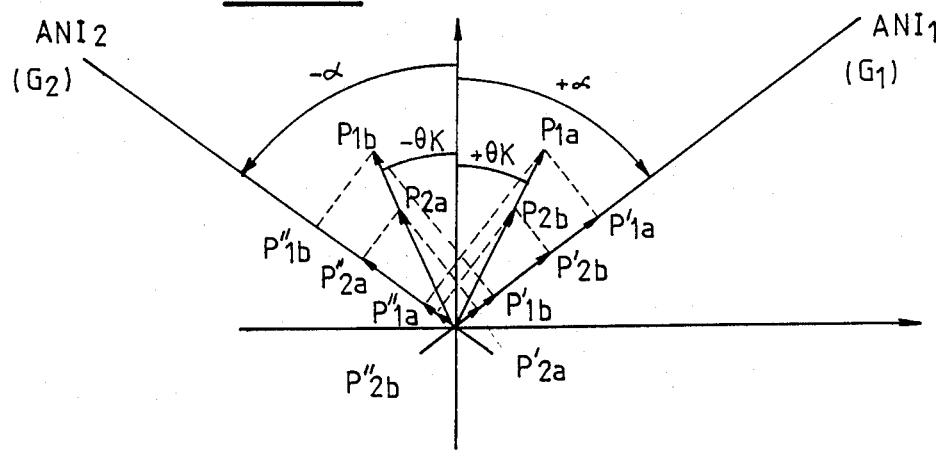
Figure 7:
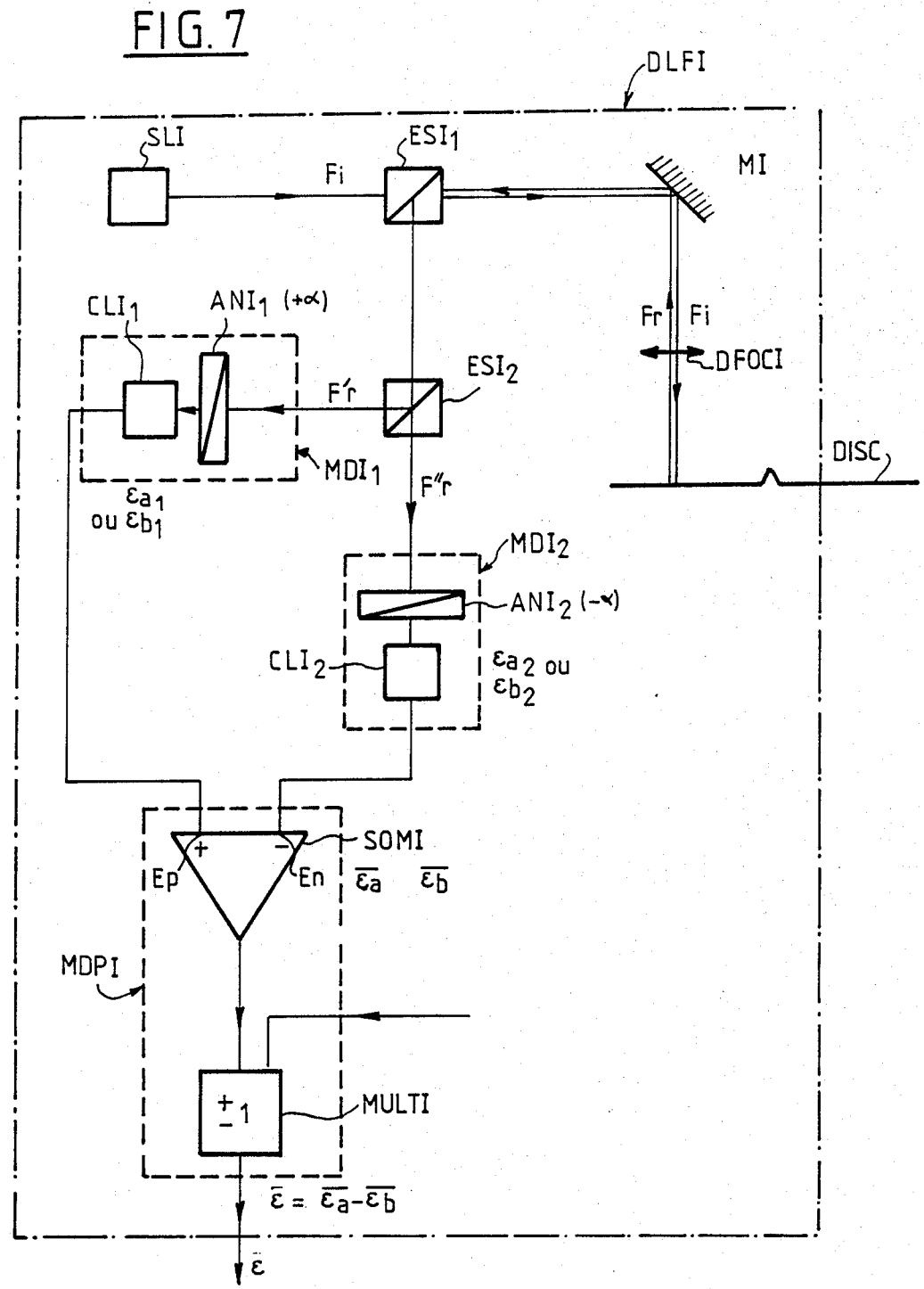
FIG. 7 shows a preferred exemplary embodiment of an optical reading circuit for the fine-position information of the reference zones.

Turning now to FIG. 6:

For the portion of the light spot SPI located facing a domain of positive magnetization (which corresponds to $P_{1a}$, $P_{2b}$), the electrical field vector of the beam Fr undergoes a Kerr-effect rotation of $+\Theta_k$, while for the portion of the spot SPI located facing domains of negative magnetization (which corresponds to $P_{2a}$ and $P_{1b}$), the electrical field vector of the beam Fr undergoes a Kerr-effect rotation equal to $-\Theta_k$. Turning to the projections of each of the electrical field vectors (to which the light powers $P_{1a}$, $P_{2a}$, $P_{1b}$, $P_{2b}$ have been assigned), over the overriding directions of propagation of the light of the analyzers $ANI_1$ and $ANI_2$, one obtains, respectively, first:

$$P'_{1a}, P'_{2b}, P'_{1b}, P'_{2a}$$

and secondly: $P''_{1b}, P''_{2a}, P''_{1a}, P''_{2b}$.

If $G_1$ and $G_2$ are, respectively, the gains of the amplifiers of circuits $CLI_1$ and $CLI_2$ (where $G_1$ and $G_2$ are expressed in volts per watts, for example), then the following equations 1–7 can be written in succession:

$$\epsilon a1 = (P'_{1a} - P'_{2a}) G_1 \text{ and } \epsilon b1 = (P'_{2b} - P'_{1b}) G_1 \quad (1)$$

$$\epsilon a2 = (P''_{2a} - P''_{1a}) G_2 \text{ and } \epsilon b2 = (P''_{1b} - P''_{2b}) G_2 \quad (2)$$

$$\begin{cases} \overline{\epsilon a} = \overline{\epsilon a1} - \overline{\epsilon a2} = (P'_{1a} - P'_{2a}) G_1 - (P''_{2a} - P''_{1a}) G_2 & (3) \\ \overline{\epsilon b} = \overline{\epsilon b1} - \overline{\epsilon b2} = (P'_{2b} - P'_{1b}) G_1 - (P''_{1b} - P''_{2b}) G_2 & (4) \end{cases}$$

where $\overline{\epsilon}_{a1}$, $\overline{\epsilon}_{a2}$, $\overline{\epsilon}_{b1}$, $\overline{\epsilon}_{b2}$, $\overline{\epsilon}_a$, $\overline{\epsilon}_b$ are the mean values of $\epsilon_{a1}$, $\epsilon_{a2}$, $\epsilon_{b1}$, $\epsilon_{b2}$, $\epsilon_a$, $\epsilon_b$, calculated over the integration time $t_i$.

Moreover, the following is true:

$$P'_{2b} = P''_{2a};\ P'_{1b} = P''_{1a};\ P''_{1b} = P'_{1a};\ P''_{2b} = P'_{2b} \quad (5)$$

Hence:

$$\overline{\epsilon b} = (P''_{2a} - P'_{1a}) G_1 - (P'_{1a} - P'_{2a}) G_2 \quad (6),$$

and $$\overline{\epsilon} = \overline{\epsilon a} - \overline{\epsilon b} = (P'_{1a} - P'_{2a}) - (P'_{2a} - P'_{1a})(G_1 + G_2) \quad (7),$$

$\overline{\epsilon}$ being the mean value of $\epsilon$ calculated over the integration time $t_i$.

It is seen that an expression of $\overline{\epsilon}$ proportional to the sum $(G_1 + G_2)$ is obtained.

Comparison of equations 3 and 4 and 7 makes it possible to measure the advantages obtained by the mode of writing fine-position information according to the invention where each group $GDP_{ij}$ includes two domains of opposed magnetization, $AP_{ij}$ and $BP_{ij}$.

In fact, if the group $GDP_{ij}$ comprises only a single domain, then:

$$\overline{\epsilon} = \overline{\epsilon}_a \text{ or } \overline{\epsilon} = \overline{\epsilon}_b \quad \text{(equation 3)}.$$

Consequently, in this case, since the spot SPI is assumed to be perfectly centered over a track (straddling $AP_{ij}$ and $AP_{i(j+1)}$), with $P'_{1a} - P'_{2a} = P''_{2a} - P''_{1a}$ if $G_1 = G_2$ (which is frequently true in practice), then $\epsilon_a$ is not equal to 0, which is not desirable, since a zero signal does not correspond to perfect centering of the spot. It can then be said that an "offset" has been introduced.

Contrarily, considering equation 7, one sees:

(1) that $\overline{\epsilon}$ is independent of any difference between $G_1$ and $G_2$, (2) that $\epsilon = 0$, if the spot is perfectly centered on a track. Hence no offset has been introduced, regardless of any differences between $G_1$ and $G_2$.

It can be said that a double differential detection is performed, on the one hand because the reading device $DLFI_1$ includes two differential paths, that is, the path formed by $ANI_1$ and $CLI_1$ (means $MDI_1$) and the path formed by $ANI_2$ and $CLI_2$ (means $MDI_2$), and on the other hand because each group of fine-position information $GDP_{ij}$ includes two domains of opposite magnetization, $AP_{ij}$ and $BP_{ij}$.

This system permits precise detection of the fine-position information and does not introduce any offset and minimizes the noise signal (by the use of the integrator SOMI functioning as a differential amplifier).

What is claimed is:

1. A magnetic recording disc having opposed surfaces, at least one of said surfaces having a magnetic recording layer, said disc being adapted to move in a rotating manner relative to a magnetic transducer positioned for recording data on said layer, a plurality of concentric annular tracks being defined on said layer, each track being divided into a plurality of sectors, each of said sectors having associated therewith a reference zone containing identification data for said sector, said reference zone being preceded by a blank zone having a uniform magnetization and separated from said reference zone by a special magnetic transition allowing detection of the beginning of the zone, and said reference zone ($ZRP_{ij}$) comprising successively from the special magnetic transition:

a first group of preamble information ($ZSY_{ij}+ZCA_{ij}$), a second group of absolute address information ($ZAD_{ij}$), a third group of fine-position information ($GDP_{ij}$), said first and second groups being disposed and centered on a track of serial number j, while said third group is offset with respect to a center said track of serial number j, such that a boundary between said third group of said reference zone and an adjacent third group of an adjacent reference zone coincides with said center of the track of serial number j, wherein said third group comprises consecutively a first and a second magnetic domain ($AP_{ij}$, $BP_{ij}$), each having a uniform magnetization opposite one another, and wherein corresponding magnetic domains ($AP_{ij}$, $AP_{i(j+1)}$), of said third group and an adjacent third group of said sector are of opposite magnetization.

2. A magnetic recording disc as defined by claim 1, characterized in that the group of preamble information includes a first subgroup ($ZSY_{ij}$) of synchronizing information, preceding a second subgroup ($ZCA_{ij}$) of automatic gain control information.

3. A magnetic recording disc as defined by claim 1, characterized in that the first portion precedes the second portion.

4. A pattern of magnetically coded information written on a disc adapted to rotate relative to a magnetic transducer positioned for recording data on a magnetic recording layer of said disc, said magnetic recording layer having a plurality of concentric annular tracks, each of said tracks comprising a plurality of sectors, said pattern sequentially comprising:

a blank zone having uniform magnetization;

a special magnetic transition allowing detection of the beginning of a reference zone;

a reference zone containing identification data for said sector, said reference zone comprising successively from said special magnetic transition:
a preamble information group;
an absolute address information group;
a first fine-position information group; wherein said preamble information group and said absolute address information group are associated with a predetermined track, and are centered on said track, and wherein a boundary between said first fine-position information group and an adjacent fine-position information group coincides with said center of said track, said fine-position information group having a first magnetic domain and a second magnetic domain each having uniform magnetization opposite that of the other, said pattern further comprising at least a second fine-position information group adjacent said fine-position information group and associated with an adjacent reference zone, said second fine-position information group having a first magnetic domain and a second magnetic domain each having uniform and opposite magnetization, and wherein said first magnetic domain of said first fine-position information group has a magnetization opposite that of said adjacent first magnetic domain of said second fine-position information group and said second magnetic domain of said first fine-position information group has a magnetization opposite that of said adjacent second magnetic domain of said second fine-position information group.

5. An optoelectronic device for reading fine-position information ($GDP_{ij}$) written on a magnetic recording disc said optoelectronic device comprising:

a magnetic recording disc having opposed surfaces, at least one of said surfaces having a magnetic recording layer, said disc being adapted to move in a rotating manner relative to a magnetic transducer positioned for recording data on said layer, a plurality of concentric annular tracks being defined on said layer, each track being divided into a plurality of sectors, each of said sectors having associated therewith a reference zone containing identification data for said sector, said reference zone being preceded by a blank zone having a uniform magnetization and separated from said reference zone by a special magnetic transition allowing detection of the beginning of the zone, and said reference zone ($ZRP_{ij}$) comprising successively from the special magnetic transition:

a first group of preamble information ($ZSY_{ij}+ZCA_{ij}$), a second group of absolute address information ($ZAD_{ij}$), a third group of fine-position information ($GDP_{ij}$), said first and second groups being disposed and centered on a track of serial number j, while said third group is offset with respect to a center said track of serial number j, such that a boundary between said third group of said reference zone and an adjacent third group of an adjacent reference zone coincides with said center of the track of serial number j, wherein said third group comprises consecutively a first and a second magnetic domain ($AP_{ij}$, $BP_{ij}$), each having a uniform magnetization opposite one another, and wherein corresponding magnetic domains ($AP_{ij}$, $AP_{i(j+1)}$), of said third group and an adjacent third group of said sector are of opposite magnetization, said optoelectronic device comprising:
a light source (SLI) emitting a single incident beam of polarized light ($F_i$) onto the surface of the carrier, and a predetermined region thereof, the interaction of which with the magnetic state of the carrier in this region produces a rotation of the plane of polarization of the light;

optical means (DFOCI) for focusing the incident beam ($F_i$) onto the surface of the carrier, the path of which on the surface forms a light spot (SPI) and which is reflected by the disk, becoming a reflected beam (Fr), which is transmitted to:

means (ESI$_2$) which separates said reflected beam (Fr) into two reflected beams (F'r and F"r);

first means (MDI$_1$) for detecting the angle of rotation of the plane of polarization of the light, including a first light analyzer (ANI$_1$) an overriding direction of propagation of the light of which forms an angle $+\alpha$ with an electrical field vector ($E_i$) of the incident beam ($F_i$), which means receive the reflected beam (Fr) and deliver a first signal ($\epsilon_{a1}$, $\epsilon_{b1}$) as a function of the position of the light spot SPI with respect to the two second portions (GDP$_{ij}$, GDP$_{i(j+1)}$) of two adjacent reference zones (ZRP$_{ij}$, ZRP$_{i(j+1)}$);

a second means (MDI$_2$) for detecting the angle of rotation of the plane of polarization of the light, including a second light analyzer (ANI$_2$) an overriding direction of propagation of the light of which forms an angle $-\alpha$ with an electrical field vector ($E_i$) of a further-reflected beam (F"r), which means receive the further-reflected beam (F"r), and deliver a second signal ($\epsilon_{a2}$, $\epsilon_{b2}$) as a function of the position of the light spot SPI with respect to the two second portions (GDP$_{ij}$, GDP$_{i(j+1)}$) of two adjacent reference zones (ZRP$_{ij}$, ZRP$_{i(j+1)}$); and means (MDPI) for furnishing a fine-position signal $\epsilon$ indicating the position of the light spot with respect to the said second portions, which means receive the first and second signals.

6. A magnetooptical memory comprising a magnetooptic disk and an optoelectronic reading device, the optoelectronic reading device being adapted to read fine-position information (GDP$_{ij}$) written on a magnetic recording disc said optoelectronic device comprising:

a magnetic recording disc having opposed surfaces, at least one of said surfaces having a magnetic recording layer, said disc being adapted to move in a rotating manner relative to a magnetic transducer positioned for recording data on said layer, a plurality of concentric annular tracks being defined on said layer, each track being divided into a plurality of sectors, each of said sectors having associated therewith a reference zone containing identification data for said sector, said reference zone being preceded by a blank zone having a uniform magnetization and separated from said reference zone by a special magnetic transition allowing detection of the beginning of the zone, and said reference zone (ZRP$_{ij}$) comprising successively from the special magnetic transition:

a first group of preamble information (ZSY$_{ij}$+-ZCA$_{ij}$), a second group of absolute address information (ZAD$_{ij}$), a third group of fine-position information (GDP$_{ij}$), said first and second groups being disposed and centered on a track of serial number j, while said third group is offset with respect to a center said track of serial number j, such that a boundary between said third group of said reference zone and an adjacent third group of an adjacent reference zone coincides with said center of the track of serial number j, wherein said third group comprises consecutively a first and a second magnetic domain (AP$_{ij}$, BP$_{ij}$), each having a uniform magnetization opposite one another, and wherein corresponding magnetic domains (AP$_{ij}$, AP$_{i(j+1)}$), of said third group and an adjacent third group of said sector are of opposite magnetization, said optoelectronic device comprising:

a light source (SLI) emitting a single incident beam of polarized light ($F_i$) onto the surface of the carrier, and a predetermined region thereof, the interaction of which with the magnetic state of the carrier in this region produces a rotation of the plane of polarization of the light;

optical means (DFOCI) for focusing the incident beam ($F_i$) onto the surface of the carrier, the path of which on the surface forms a light spot (SPI) and which is reflected by the disk, becoming a reflected beam (Fr), which is transmitted to:

means (ESI$_2$) which separates said reflected beam (Fr) into two reflected beams (F'r and F"r);

first means (MDI$_1$) for detecting the angle of rotation of the plane of polarization of the light, including a first light analyzer (ANI$_1$) an overriding direction of propagation of the light of which forms an angle $+\alpha$ with an electrical field vector ($E_i$) of the incident beam ($F_i$), which means receive the reflected beam (Fr) and deliver a first signal ($\epsilon_{a1}$, $\epsilon_{b1}$) as a function of the position of the light spot SPI with respect to the two second portions (GDP$_{ij}$, GDP$_{i(j+1)}$) of two adjacent reference zones (ZRP$_{ij}$, ZRP$_{i(j+1)}$);

a second means (MDI$_2$) for detecting the angle of rotation of the plane of polarization of the light, including a second light analyzer (ANI$_2$) an overriding direction of propagation of the light of which forms an angle $-\alpha$ with an electrical field vector ($E_i$) of a further-reflected beam (F"r), which means receive the further-reflected beam (F"r), and deliver a second signal ($\epsilon_{a2}$, $\epsilon_{b2}$) as a function of the position of the light spot SPI with respect to the two second portions (GDP$_{ij}$, GDP$_{i(j+1)}$) of two adjacent reference zones (ZRP$_{ij}$, ZRP$_{i(j+1)}$); and means (MDPI) for furnishing a fine-position signal $\epsilon$ indicating the position of the light spot with respect to the said second portions, which means receive the first and second signals.

* * * * *

UNITED STATES PATENT AND TRADEMARK OFFICE
CERTIFICATE OF CORRECTION

PATENT NO.  : 4,984,901
DATED       : January 15, 1991
INVENTOR(S) : Christian Maury It is certified that error appears in the above-identified patent and that said Letters Patent is hereby corrected as shown below:

On the Title Page and Col. 1, lines 1-5, should read --MAGNETIC RECORDING DISC HAVING SECTOR REFERENCE ZONE, OPTOELECTRONIC DEVICE FOR READING SAME, AND MAGNETOOPTICAL MEMORY EMPLOYING SAID DEVICE --.

Signed and Sealed this

Twenty-second Day of December, 1992

Attest:

DOUGLAS B. COMER

*Attesting Officer*    *Acting Commissioner of Patents and Trademarks*